United States Patent [19]
Porath-Furedi

[11] 3,733,136
[45] May 15, 1973

[54] METHOD AND APPARATUS FOR MEASURING THE DEGREE OF ASSYMETRY OF NON-SPHERICAL PARTICLES

[76] Inventor: Asher Porath-Furedi, Batei Even 64/9 Kiriat Yovel, Jerusalem, Israel

[22] Filed: July 12, 1971

[21] Appl. No.: 161,798

[52] U.S. Cl. .................356/197, 356/39, 356/163, 356/208
[51] Int. Cl. ....................G01n 21/24, G01n 33/16
[58] Field of Search.....................356/197, 39, 102, 356/167, 163, 157, 156, 208, 196; 250/222 PC

[56] References Cited

UNITED STATES PATENTS 3,049,047  8/1962  Polanyi et al. .................356/102
3,216,311  11/1965  Bibbero et al. ................356/156
3,275,834  9/1966  Stevens .........................356/102

*Primary Examiner*—Ronald L. Wibert
*Assistant Examiner*—V. P. McGraw
*Attorney*—Benjamin J. Barish

[57] ABSTRACT

Method and apparatus for measuring the degree of assymetry of non-spherical particles (e.g., erythrocytes, i.e., red blood cells) wherein the particles are suspended in a light-transparent medium, the medium is mixed to cause the particles to rotate while light is projected through the medium, and the differences in the profiles of the particles to the light when the particles move at different angles to the path of the light through the medium are detected to provide an indication of the degree of assymetry of the particles.

9 Claims, 8 Drawing Figures

PATENTED MAY 15 1973　　　　　　　　　　　　　3,733,136

Inventor
Asher Porath-Furedi

By _____
    Attorney

METHOD AND APPARATUS FOR MEASURING THE DEGREE OF ASSYMETRY OF NON-SPHERICAL PARTICLES

BACKGROUND OF THE INVENTION

The present invention relates to methods and apparatus for measuring the degree of assymetry of non-spherical particles.

There are many areas where a need exists to differentiate particles by their shape, and also to maintain a follow-up of the shape changes of particles being subjected to various environmental influences. One such area is in the measurement of the shape of erythrocytes (red blood cells) which are in a suspension, and the measurement of the erythrocyte shape changes under various osmotic pressures. Other areas where such measurements are needed are mentioned below.

There presently exists no simple, quick and efficient technique for making such measurements.

BRIEF SUMMARY OF THE PRESENT INVENTION

The present invention provides a method and apparatus which may be used for making the above described measurements in a simple, quick and efficient manner.

According to a broad aspect of the present invention, there is provided a method of measuring the degree of assymetry of non-spherical particles, comprising the steps of suspending a sample of the particles in a light-transparent medium, causing the suspended particles to move in the medium, projecting light through the medium, and detecting the difference in the profiles of the particles to the light when the particles move at a different angle to the path of the light through the medium. The detected differences in the profiles are an indication of the degree of assymetry of the particles.

More particularly, the suspended particles and light-transparent medium are caused to rotate in a light-transparent container, and the difference in the profiles are detected by detecting the amount of light exiting from the container at different distances laterally of their axis of rotation.

Three techniques are described for accomplishing the foregoing. In one technique, the particles are rotated about a fixed axis of rotation, and the detection is made simultaneously at at least two discrete points at different distances laterally of the axis of rotation. In a second technique, the particles are also rotated about a fixed axis of rotation, and the detection is made by moving a detector laterally of the axis of rotation. In a third technique, the detection is made by moving the axis of rotation of the suspended particles with respect to the detector.

The invention also concerns apparatus for making the measurements in accordance with the foregoing techniques.

As indicated above, a specific application of the method and apparatus is for the measurement of the shape of erythrocytes (red blood cells) which are in a suspension, and the measurement of the erythrocyte shape changes under various osmotic pressures. Furthermore, it is possible to follow by this method and apparatus the erythrocyte shape changes which are induced by the change of osmotic pressure or by chemical and/or biological substances and/or physical effects and/or pathological conditions.

Another scientific application is to use the method and apparatus as described above for measuring shapes of other biological substances, such as human, animal, plant cells, microorganisms or macromolecules.

Further, in solving various problems in the earth sciences, it is often necessary to distinguish rapidly between spherical and non-spherical particles. Clastic (earth) deposits, sand, loess, and river alluvium can be efficiently analyzed as to grain form. The result can be used as an aid to determine geomorphic origin and dominant process. Furthermore, stratographic relationships of grain form usually undetectable in standard analyses of size, can be isolated with a potential use in the petroleum drilling industry.

In industry, it can be used for the standardization of particles and for the follow-up of change in particle shape.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENT

As known, the amount of light which passes through a suspension of particles is affected by the angle between the particle's longest axis and the direction of light. If the particles in the suspension are in motion, the amount of light which passes through the suspension fluctuates. If a particle's motion in the suspension is statistically arranged so that the majority of the particles at one point turn their edge and at another point turn their side to the direction of light, the change of the amount of the transmitted light is proportional to the ratio of the particle's longest and shortest axis. For suspended spheres, this ratio = 1. Thus, the shape and the change of shape of non-spherical particles can be measured and followed.

Figure 1A:
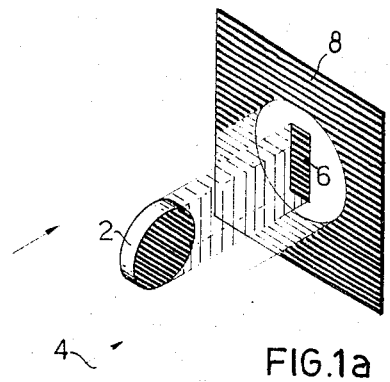
FIGS. 1a and 1b illustrate how the degree of assymetry of non-spherical particles (in this case erythrocytes, i.e., red blood cells), may be measured by detecting the differences in the profiles of the particles to a light source when the particles move at different angles to the path of the light.
Figure 1B:
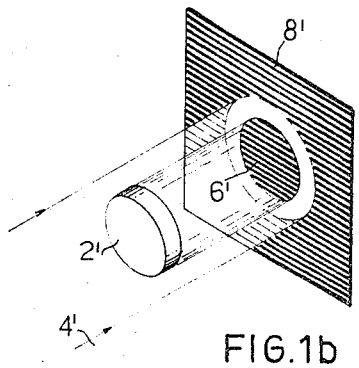

The foregoing is diagrammatically illustrated in FIGS. 1a and 1b. In FIG. 1a, it will be seen that a non-spherical particle 2, in this case an erythrocyte (red blood cell) which is of double-concave disc-shape, has its edge turned to the light source 4, providing a narrow profile, and thereby a narrow shadow 6, on a light detector surface 8; whereas in FIG. 1b the erythrocyte 2' has its large-surface face turned to the path of the light source 4', and thereby provides a large profile and large shadow 6' on the surface of light detector 8'.

In accordance with the invention, the non-spherical particles whose shape is to be detected are suspended in a light-transparent medium, which medium is then rotated while a light source is projected through it, and the differences in the profiles of the particles to the light are detected when the particles move at different angles to the path of the light through the medium. These detected differences in the profile provide an indication of the shape, or degree of asymmetry of the particles.

Figure 2A:
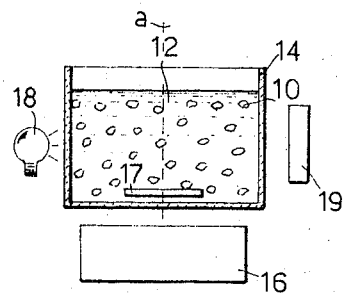
FIGS. 2a and 2b illustrate one technique for making this measurement.
Figure 2B:
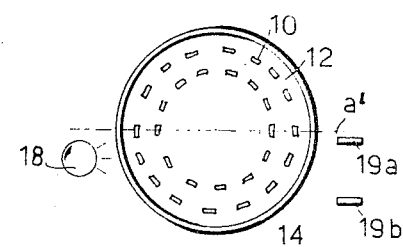

FIGS. 2a and 2b illustrate one technique for making this test. Here, the particles 10 are suspended in a light-transparent medium 12 in a light-transparent container 14. The particles and the medium are mixed by a magnetic stirrer 16 acting on a magnetic mixing element 17 in container 14. A light source 18 at one side of the container projects light through the container and the medium containing the suspended particles, and light detecting means 19 at the other side of the container detects the differences in the light exiting from the container.

In the embodiments of FIGS. 2a, 2b, light detecting means 19 is constituted of two separate light detectors 19a, 19b (FIG. 2b) located at different distances laterally of the axis of rotation a of the suspended particles. It will be seen, as shown in FIG. 2b, that detector 19a (the one which is closer to the plane a' of the axis of rotation) will be influenced mostly by particles presenting their large-surface profile to the light source 18, whereas detector 19b will be influenced mostly by particles presenting their smaller-surface profile to the light source. The difference in the amount of light detected by the two detectors will be an indication of the assymetry of the suspended particles.

Where the suspended particles 10 are normally opaque to the passage of light, then detector 19a will receive less light than detector 19b. However, there are many cases where the particles are normally transparent or translucent to the passage of light when the particles present their large-surface profile to the light, but opaque when they present their narrow-surface profile to the light. This is the case with red blood cells, and in such cases detector 19a will receive more light than detector 19a.

In most cases, it is not the absolute value of light detected by the two detectors which is of interest in making the test, but rather the relative differences in the light fluctuations detected by the two particles.

Figure 3:
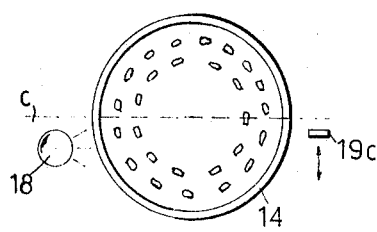
FIG. 3 illustrates a second technique for making this measurement.

FIG. 3 illustrates another technique which may be used. In FIG. 3, instead of providing two detectors 19a, 19b, there is provided a single detector 19c, and that detector is moved laterally of the axis of rotation of the suspended particle. Thus, the light detected by detector 19c will fluctuate in accordance with the detected differences in the profiles of the suspended particles as the detector moves with respect to the axis of rotation a, and these fluctuations will provide an indication of the shape or degree of assymetry of the particles.

Figure 4A:
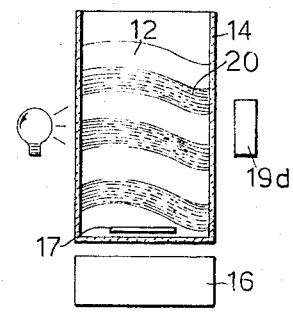
FIGS. 4a and 4b illustrate a third technique for making this measurement.
Figure 4B:
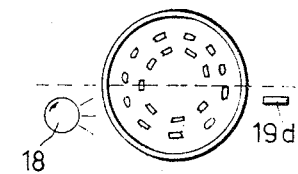

FIG. 4a and 4b illustrate a further variation. Here there is a single fixed detector and the differences in the profiles of the particles to the path of light are detected by moving the axis of rotation of the particles with respect to the detector. This is done by mixing the particles by the use of magnetic mixer 16 and magnetic element 17, so as to cause the particles and suspending medium 12 to rotate within the container 14 along a non-constant axis of rotation. In other words, the axis of rotation of the particles continuously changes. This was effected in the experiments described below, and at the same time it was seen that the particles tend to "bunch" together, as shown by the helically concentrated areas 20. In this case, the light detector 19d was fixed in position, slightly-off-center of the central axis of the container 14. Since the axis of rotation of the suspended particles fluctuated within container 14, it also fluctuated with respect to light detector 19d. Thus, the output of detector 19d was found to be a fluctuating output, the fluctuations of which were produced by the different profiles presented by the suspended particles to the path of light, and thereby providing an indication of the degree of assymetry of the particles.

The following experiments were performed in accordance with the technique of FIGS. 4a, 4b, with respect to human erythrocytes (red blood cells) suspended in sodium chloride solutions of different concentrations, thereby providing different osmotic pressure pending to change the shape of the erythrocytes. The container was a 12mm inside diameter test tube, the light source was a tungesten lamp including a monochromator, and the detector was a photomultiplier having a slit width of 0.075mm, a height of 10mm, and fixed in position at a point 1.5mm off the center axis of the test tube. The detector fed an oscilloscope having a sensitivity of 0.005v/cm, a sweep of 2 msec/cm, and an amplification of 4X in "channel I out." The mixer was a magnetic stirrer having a speed of 1,400 rev/min, and the magnetic element was a plastic-coated rod 3mm diameter, 9mm length.

Three different media where tested as follows:

Medium I: 0.9% NaCl solution in bidistilled water at pH 7.4 (buffer imadazol 0.005M)

Medium II: 0.7% NaCl solution in bidistilled water at pH 7.4 (buffer imidazol 0.005M)

Medium III: 0.5% NaCl solution in bidistilled water at pH 7.4 (buffer imidazol 0.005M)

Volume: 5 ml. The volume of whole blood in 1 ml medium: ≈10 μlit.optical density corrected to 2.5 O.D. (Optical Density Units)

The results were as follows:

| Medium | Volts (recorded at "channel I out") | Shape of cells as seen through microscope |
|---|---|---|
| I | 0.1 | biconcave disc |
| II | 0.035 | convex disc |
| III | 0.005 | sphere |

The shape of erythrocytes was affected by changes in the osmotic pressure of the medium (by the different salt concentration). As the cells became sphere-like, the measured signal decreased.

Figure 5:
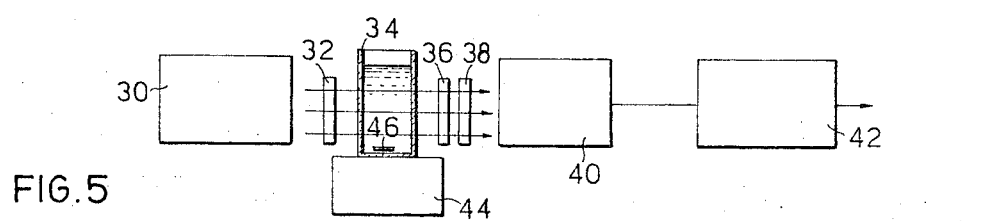
FIG. 5 illustrates a block diagram of a system that may be used for making the measurements in accordance with any of the foregoing techniques but particularly that of FIGS. 4a, 4b.

FIG. 5 diagrammatically illustrateS an apparatus for performing the above tests, particularly the variation of FIGS. 4a, 4b. The light source, designated by box 30, preferably includes a monochrometer making it possible to choose the light wave length in which the particle is less transparent. For example, a red particle in green light is highly visible because it is optically dense, while in red light it would be translucent. Instead of a monochrometer, there may also be used light filters which could be interchanged according to the application.

The apparatus may also include a polorizer 32 at the light-source side of the container 34 and an analyzer 36 at the other side of the container. A filter 38 may also be included at that side. The light detector is designated 40, and it may be used to feed a display device, recorder, data processer, or the like, generally designated 42. The mixer is a magnetic stirrer 44 acting on magnetic element 46 within container 34.

Many changes, modifications and other applications of the illustrated embodiments will be apparent.

What is claimed is:

1. Method of measuring the degree of assymetry of non-spherical particles, comprising: suspending a sample of the particles in a light-transparent medium; causing said suspended particles to move in said medium; projecting light through said medium; and detecting the difference in the light intensity due to the difference in the profiles of the particles to the light when the particles move at different angles to the path of the light through the medium, said detected differences in the profiles being an indication of the degree of assymetry of the particles.

2. A method as defined in claim 1, wherein said suspended particles and light-transparent medium are caused to rotate in a light-transparent container, and the differences in the profiles are detected by detecting the amount of light exiting from the container at different distances laterally of the axis of rotation thereof.

3. A method as defined in claim 2, wherein said particles are rotated about a fixed axis of rotation, and said detection is made simultaneously at at least two discrete points at different distances laterally of said axis of rotation.

4. The method as defined in claim 2, wherein said particles are rotated about a fixed axis of rotation, and said detection is made by moving a detector laterally of said axis of rotation.

5. The method as defined in claim 2, wherein said detection is made by moving the axis of rotation of the suspended particles with respect to the detector.

6. Apparatus for measuring the degree of assymetry of non-spherical particles, comprising, a transparent container for receiving a sample of the particles suspended in a light-transparent medium, a light source at one side of the container, rotating means for causing said suspended particles to rotate in said container and light detector means at the other side of said container for detecting the amount of light exiting from the medium at different distances laterally of the axis of rotation thereof, said detected differences resulting from the differences in the profiles of the particles to the light when the particles move at different angles to the path of light through the medium and thereby being an indication of the degree of assymetry of the particles.

7. Apparatus as defined in claim 6, wherein said light detector means comprises separate light detectors placed at different distances laterally of the axis of rotation of the particles.

8. Apparatus as defined in claim 6, wherein said light detector means comprises a light detector and means for moving same laterally of the axis of rotation of the particles.

9. Apparatus as defined in claim 6, wherein said light detector means comprises a stationary light detector and means for moving the axis of rotation of the particles laterally with respect to said detector.

* * * * *